(12) United States Patent
Hashimoto (10) Patent No.: US 8,286,331 B2
(45) Date of Patent: Oct. 16, 2012

(54) METHOD FOR MANUFACTURING LAMINATED CORE

(75) Inventor: Akihiro Hashimoto, Kitakyushu (JP)

(73) Assignee: Mitsui High-Tec, Inc., Kitakyushu-shi (JP)

( * ) Notice: Subject to any disclaimer, the term of this patent is extended or adjusted under 35 U.S.C. 154(b) by 0 days.

(21) Appl. No.: 12/966,084

(22) Filed: Dec. 13, 2010

(65) Prior Publication Data

US 2011/0154650 A1    Jun. 30, 2011

(30) Foreign Application Priority Data

Dec. 28, 2009    (JP) .................................. 2009-298291

(51) Int. Cl.
*H02K 15/02*    (2006.01)

(52) U.S. Cl. ................. 29/596; 29/598; 29/609; 29/732; 29/564.1

(58) Field of Classification Search ............ 29/596–598, 29/732–736, 609, 564.1, 416, 738; 83/32, 83/39, 550
See application file for complete search history.

(56) References Cited

U.S. PATENT DOCUMENTS

| 4,993,290 | A | * | 2/1991 | Obradovic ........................ 83/32 |
| 5,163,217 | A | * | 11/1992 | Sakanishi ..................... 29/564.6 |
| 5,265,320 | A | * | 11/1993 | Greenway ........................ 29/596 |
| 6,745,458 | B2 | * | 6/2004 | Neuenschwander ............ 29/609 |
| 7,626,306 | B2 | * | 12/2009 | Sato ........................ 310/216.055 |
| 2009/0025203 | A1 | * | 1/2009 | Tanaka et al. ................... 29/596 |
| 2011/0154650 | A1 | * | 6/2011 | Hashimoto ..................... 29/598 |

FOREIGN PATENT DOCUMENTS

| JP | 2887428 | B2 | 4/1999 |
| JP | 2955804 | B2 | 10/1999 |

* cited by examiner

*Primary Examiner* — Minh Trinh
(74) *Attorney, Agent, or Firm* — Westerman, Hattori, Daniels & Adrain LLP (57) ABSTRACT

A method for manufacturing a laminated core includes (1) blanking a rotor core sheet 15 and a stator core sheet 14 from a thin strip material 27 and (2) laminating the stator core sheet 14 inside a die. The stator core sheet 14 includes a ring-shaped yoke piece 18 and plural magnetic pole pieces 19 integrally connecting to a radially inside of the yoke piece 18. Each of the magnetic pole pieces 19 includes a magnetic pole shaft piece 20 and a magnetic pole tooth piece 21. The magnetic pole pieces 19 are formed by blanking preparatory slots 29; coining a part or a whole of the magnetic pole shaft pieces 20 to elongate the same in a radially inward direction; and thereafter, blanking the finishing slots 30 and shaping the magnetic pole tooth pieces 21.

12 Claims, 5 Drawing Sheets

METHOD FOR MANUFACTURING LAMINATED CORE

TECHNICAL FIELD

The present invention relates to a method for manufacturing a laminated core which is applicable to, for example, a stepping motor. The method is highly productive and operable to produce stator core sheets from a thin strip material (magnetic steel sheet) with a high yield.

BACKGROUND ART

Conventionally, a laminated core for a stepping motor has a very small air gap between a rotor and a stator. When a rotor core sheet and a stator core sheet, respectively used for the rotor and the stator, are produced from one thin strip material, small metal clippings are formed in narrow gaps therebetween. The metal clippings may be broken during a punching operation and not drop into a downside of a die, a part of a die device, thereby requiring the punching operation again. What is worse, the die device may be damaged due to clogging of scraps including the metal clippings.

If magnetic pole pieces, specifically magnetic pole teeth located radially inside the stator core sheet, cannot be blanked in a desired shape, the rotor core sheet and the stator core sheet have to be blanked using the different die devices, which results in a low material yield and a high cost.

Patent Literature 1 discloses an example of the conventional art to solve the above problems. In Patent Literature 1, at least one of the rotor core sheet and the stator core sheet are coined, specifically, pressed in a thickness direction and evenly elongated so as to form thin sections. Further, both of the rotor core sheet and the stator core sheet can be produced from one magnetic steel sheet using one die device.

In a method for manufacturing a laminated core of Patent Literature 1, the thin section is elongated in a circumferential direction, and bulges are formed in an area where a wire is wound. As a countermeasure, Patent Literature 2 discloses a finishing blanking for eliminating the bulges on lateral sides of the magnetic pole teeth.

CITATION LIST

Patent Literature

[Patent Literature 1] Japanese Patent No. 2955804
[Patent Literature 2] Japanese Patent No. 2887428

SUMMARY OF INVENTION

Technical Problem

In the technique of Patent Literature 1, when the thin section is formed by coining, especially when a tip of a magnetic pole is elongated in a radial direction, one side (top or underside) of a magnetic pole piece is pressed in the thickness direction. For this reason, the magnetic pole piece becomes distorted, and caulking accuracy and dimensional accuracy of a core diameter become unstable. When the magnetic pole piece is deeply pressed to increase the elongation, the magnetic pole piece is largely distorted, causing an adverse effect on product quality.

In the technique of Patent Literature 2, the bulges are created in the circumferential direction when the thin section is formed, and only the bulges are eliminated. However, when a magnetic pole shaft piece is pressed, an inclination (deformation) arises not only in the magnetic pole shaft piece but also in a magnetic pole tooth piece integrally formed radially inside the magnetic pole shaft piece. Further, the more the elongation is increased by thinning the magnetic pole shaft piece, the larger and the deeper the magnetic pole shaft piece is pressed, which causes the distortions in entire slots and pilot holes. These distortions cannot be modified sufficiently by the technique of Patent Literature 2, and in some cases, blanking accuracy after coining is deteriorated, and a laminated core formed by laminating blanked stator core sheets has a variation in magnetic properties of magnetic poles.

In view of the above circumstances, an object of the present invention is to provide a method for manufacturing a laminated core, capable of elongating a magnetic pole piece without creating distortion at the formation of the thin section. The method can further improve caulking accuracy and dimensional accuracy of the laminated core when a rotor core sheet and a start core sheet are produced from one thin strip material.

Solution to Problem

To accomplish the above object, a method for manufacturing a laminated core according to the present invention comprises: a first step of punching out a rotor core sheet and a stator core sheet from a thin strip material, the stator core sheet positioned so as to have a common axis with the rotor core sheet, the stator core sheet including a ring-shaped yoke piece and a plurality of magnetic pole pieces, the magnetic pole pieces integrally connecting to a radially inside of the yoke piece, each of the magnetic pole pieces including a magnetic pole shaft piece and a magnetic pole tooth piece; and a second step of laminating the stator core sheet inside a die; wherein in order to form the magnetic pole pieces, firstly preparatory slots, smaller than finishing slots, are blanked, the adjacent finishing slots forming each of the magnetic pole pieces; secondly a part or a whole of the magnetic pole shaft pieces each are coined to elongate the magnetic pole pieces in a radially inward direction; and thereafter the finishing slots are blanked and the magnetic pole tooth pieces are shaped.

In the method for manufacturing the laminated core according to the present invention, it is preferable that bending deformations of the magnetic pole shaft pieces caused by coining are straightened at the same time with, or before or after the formation of the finishing slots.

Generally, if a part or whole of the magnetic pole shaft piece is coined (i.e., pressed to reduce the thickness), the magnetic pole shaft piece located inside the coined portion and the magnetic pole tooth pieces connected thereto are distorted, and such distortions (bending deformations) are straightened by pushing with a press or holding with a stripper. Especially when the adjacent magnetic pole tooth pieces are connected to each other, a radially inside of the stator core sheet is bent upwardly (or downwardly). This bent portion is straightened and planarized, as the material undergoes plastic deformation.

In the method for manufacturing the laminated core according to the present invention, it is preferable that a length of the elongation of the magnetic pole piece is within 30-80% (preferably 46-65%, more preferably 50-60%) of a thickness of the thin strip material.

If the elongation length of the magnetic pole piece is short, the elongation of the magnetic pole tooth piece in a radial direction is insufficient. If the elongation is too much, the material thickness becomes thin and magnetic properties are deteriorated, and further the magnetic pole piece becomes largely deformed.

In the method for manufacturing the laminated core according to the present invention, it is preferable that first pilot holes are formed in the thin strip material in a initial process; with reference to the first pilot holes, the rotor core sheet and the preparatory slots are blanked, the magnetic pole shaft pieces are coined, and the finishing slots are formed; at the same time with or after the formation of the finishing slots, second pilot holes are formed with reference to the finishing slots; and subsequent press works are performed with reference to the second pilot holes. This enables the stator core sheet to be formed more precisely.

In this case, it is preferable that the second pilot hole has a larger diameter than the first pilot hole, and the second pilot hole is formed so as to overlap the first pilot hole.

Here, the second pilot hole may be placed in a different position from the first pilot hole.

Also in this method, it is preferable that the vertically adjacent stator core sheets are interlocked and laminated via caulking portions, and the caulking portions are formed with reference to the second pilot holes.

In the method for manufacturing the laminated core according to the present invention, it is preferable that the magnetic pole tooth pieces are formed by: blanking first slits forming adjacent small teeth located radially inside the magnetic pole tooth pieces, and second slits forming the adjacent magnetic pole pieces, in a manner that an annular piece located radially inside the magnetic pole tooth pieces is left attached; and then blanking the annular piece so as to form radially inner ends of the small teeth.

In this case, it is preferable that the annular piece has a minimum radial length of 0.1 mm or more. This enables the annular piece to be cut out, with its annular shape retained.

Advantageous Effects of Invention

In the method for manufacturing the laminated core according to the present invention, in order to form the magnetic pole pieces, firstly the preparatory slots, smaller than the finishing slots, are blanked, the adjacent finishing slots forming each of the magnetic pole pieces; secondly a part or a whole of the magnetic pole shaft pieces each are coined to elongate the magnetic pole shaft pieces in a radially inward direction; and thereafter the finishing slots are blanked and the magnetic pole tooth pieces are shaped. Thus, the coined portions of the magnetic pole shaft pieces can be stably elongated. Also, the finishing slots are blanked after the coining of the magnetic pole shaft pieces, so that entire slots, including the magnetic pole pieces deformed by coining, can be formed in a predetermined dimension. As a result, dimensional accuracy for finishing the stator core sheet can be improved.

The magnetic pole shaft pieces and the magnetic pole tooth pieces connected thereto are deformed by coining. Such deformations (distortions) caused by coining are straightened at the same time with, or before or after the formation of the finishing slots, thereby removing the deformations and planarizing the stator core sheet.

In the method for manufacturing the laminated core according to the present invention, the magnetic pole piece is elongated such that the length of the elongation thereof is within 30-80% of the thickness of the thin strip material, thereby securing sufficient areas for forming the small teeth inside the stator core sheet.

In the method for manufacturing the laminated core according to the present invention, the first pilot holes are formed in the thin strip material in the initial process; with reference to the first pilot holes, the rotor core sheet and the preparatory slots are blanked, the magnetic pole shaft pieces are coined, and the finishing slots are formed; at the same time with or after the formation of the finishing slots, the second pilot holes are formed with reference to the finishing slots; and the subsequent press works are performed with reference to the second pilot holes. Therefore, the deformation of the stator core sheet caused by coining can be modified twice, thereby manufacturing the stator core sheet with higher accuracy.

Here, the second pilot hole has the larger diameter than the first pilot hole, and the second pilot hole is formed so as to overlap the first pilot hole. Therefore, the stator core sheet can be efficiently produced from the thin strip material, and areas where the first pilot holes are formed can be used effectively.

Further, the vertically adjacent stator core sheets are interlocked and laminated via the caulking portions, and the caulking portions are formed with reference to the second pilot holes. Therefore, the caulking portions can be arranged with reference to the positions of the magnetic pole pieces.

In the method for manufacturing the laminated core according to the present invention, the magnetic pole tooth pieces are formed by: blanking the first slits forming the adjacent small teeth located radially inside the magnetic pole tooth pieces, and the second slits forming the adjacent magnetic pole pieces (magnetic pole tooth pieces), in a manner that the annular piece located radially inside the magnetic pole tooth pieces is left attached; and then blanking the annular piece so as to form the radially inner ends of the small teeth. Therefore, the dimensional accuracies of the grooves between the small teeth and circular arcs of the radially inner ends of the small teeth can be improved. In addition, accuracy of a punch (male die) can be improved, thereby enhancing an operating life of the punch.

In this case, the annular piece has the minimum radial length of 0.1 mm or more, which enables the annular piece to be cut out, with its annular shape retained. Therefore, the dimensional accuracy of a circle inside the small teeth can be improved.

BRIEF DESCRIPTION OF DRAWINGS

FIG. 2 (A) is a plan view of a stator core sheet used for the stator core.

FIG. 2 (B) is a cross-sectional view, taken along line A-A of FIG. 2 (A).

DESCRIPTION OF EMBODIMENTS

Figure 1:
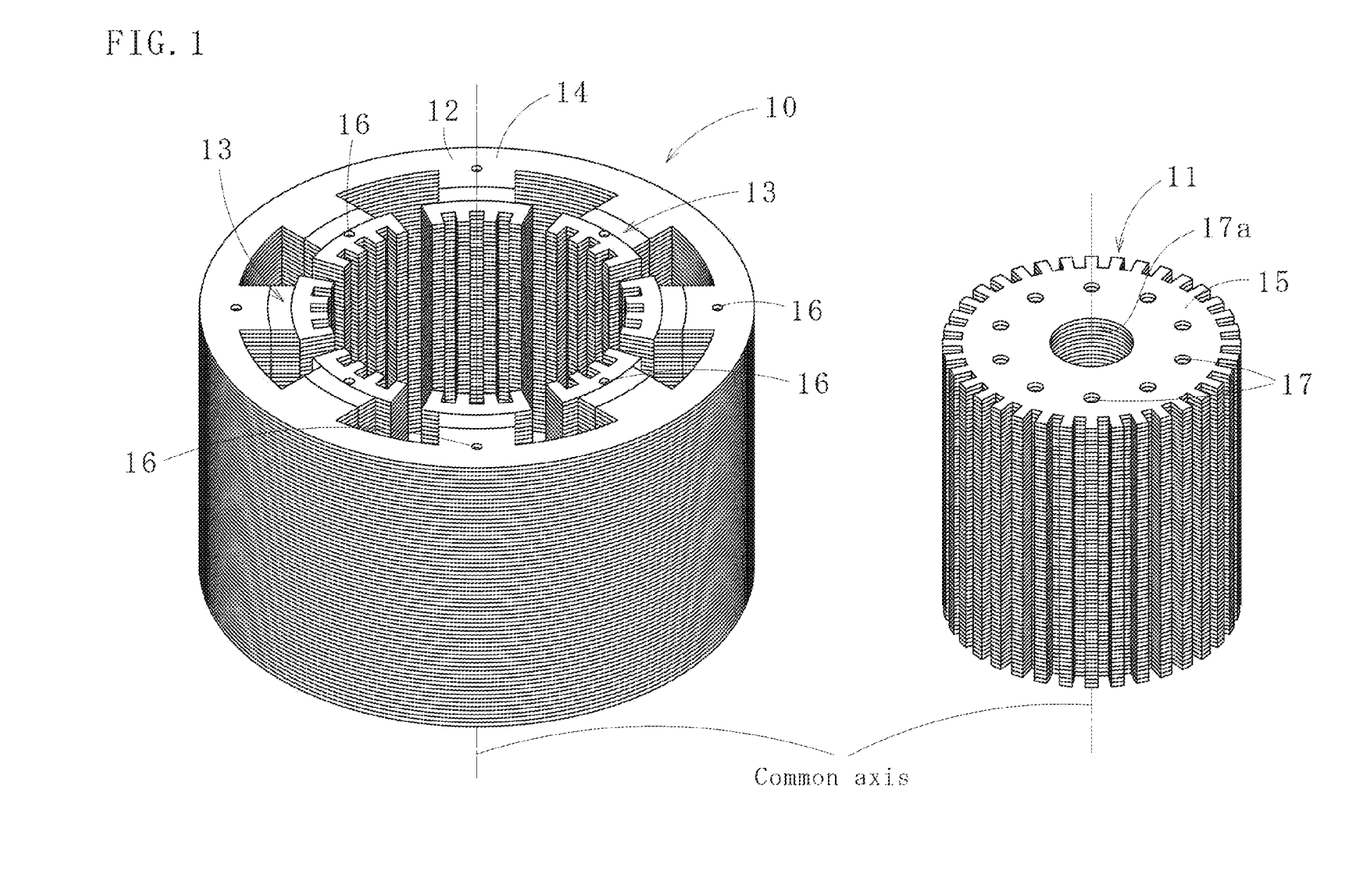
FIG. 1 is a perspective view of a stator core and a rotor core, manufactured by a method for manufacturing a laminated core according to one embodiment of the present invention.

FIG. 1 shows a stator core 10 and a rotor core 11, manufactured by a method for manufacturing a laminated core according to one embodiment of the present invention. The stator core 10 and the rotor core 11 are used for a stepping motor. The stator core 10 includes a yoke section 12 having an annular shape when viewed from the top and a plurality of magnetic pole sections 13 provided inside the yoke section 12. The stator core 10 and the rotor core 11 are respectively formed by caulking (interlocking) and laminating stator core sheets 14 and rotor core sheets 15, and both of the core sheets 14, 15 are made of a magnetic steel sheet. Here, reference signs 16, 17 indicate caulking (interlocking) portions, and a reference sign 17a indicates a shaft hole. The caulking portions 16, 17 are well-known half-press caulking (half-hollow rivet) or V-shaped caulking.

Figure 2A:
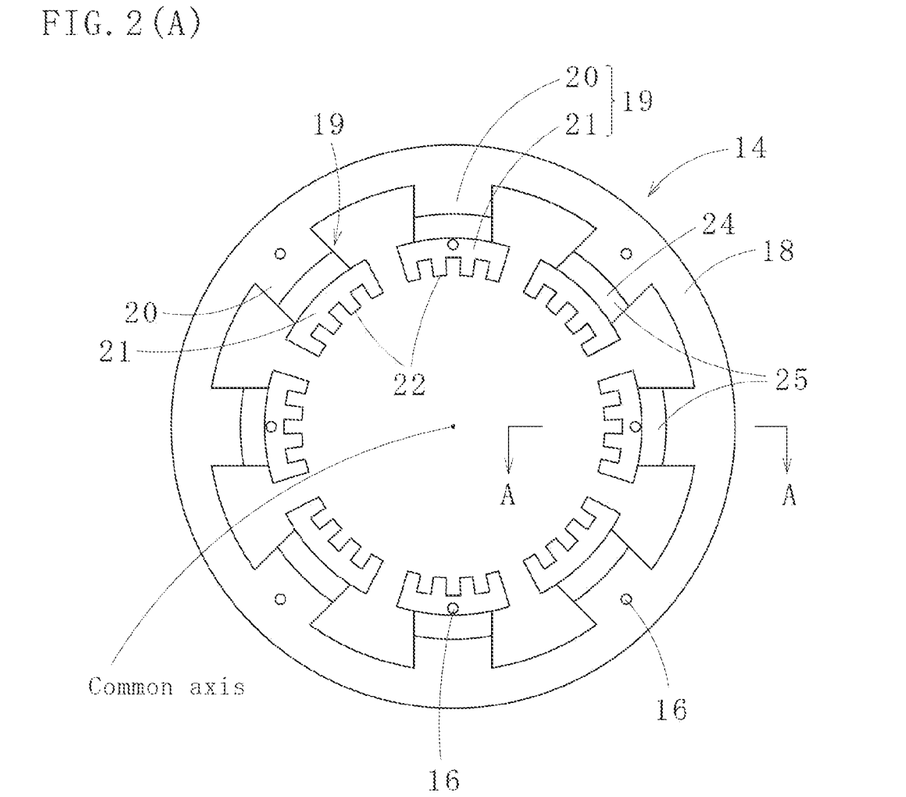
Figure 2B:
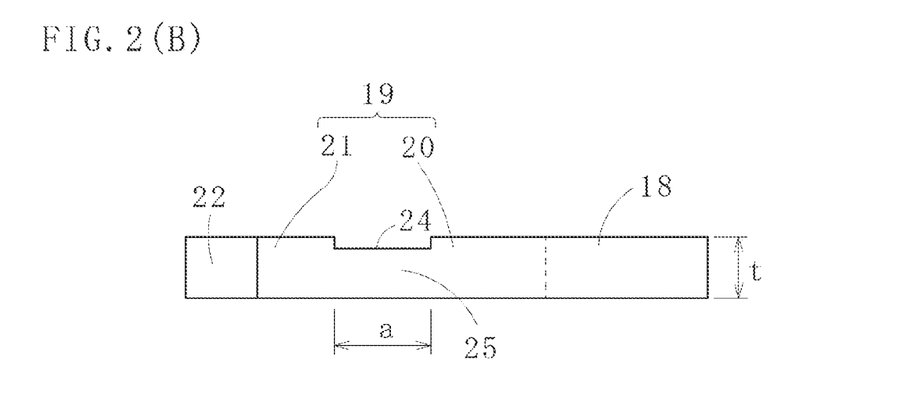

As shown in FIGS. 2 (A) and 2 (B), the stator core sheet 14 includes a ring-shaped yoke piece 18 and a plurality of (eight in this embodiment) magnetic pole pieces 19 integrally formed radially inside the yoke piece 18. The magnetic pole piece 19 includes a magnetic pole shaft piece 20 integrally formed inside the yoke piece 18 and a magnetic pole tooth piece 21 integrally formed inside the magnetic pole shaft piece 20. The magnetic pole tooth piece 21 includes a plurality of small teeth 22 radially inside thereof.

In this embodiment, a part (or a whole) of each of the magnetic pole shaft pieces 20 is coined to form a groove 24 having a uniform radial length. The grooves 24 are aligned in a circumferential direction (i.e., located on the same circumference). And, a thin section 25 is formed in the groove 24.

Figure 3:
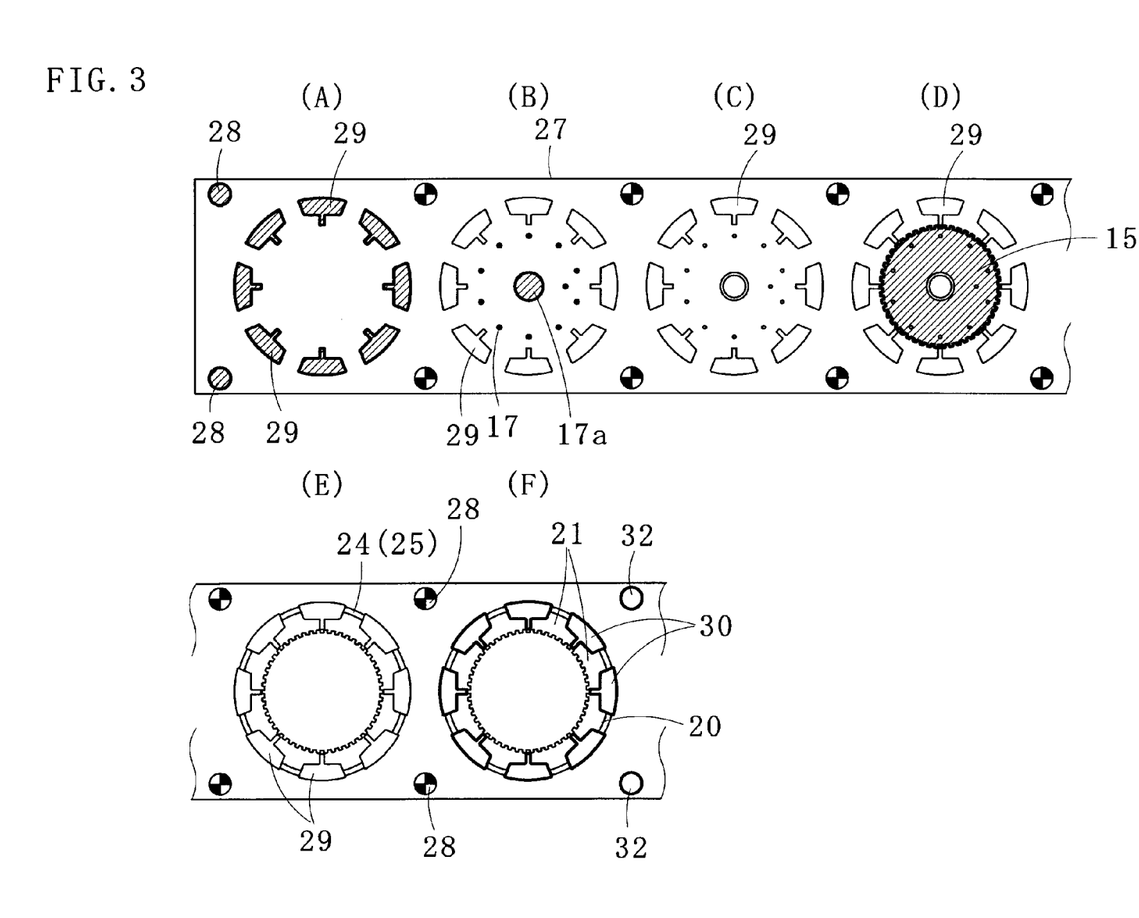
FIG. 3 is a process diagram showing the method for manufacturing the laminated core according to one embodiment of the present invention.
Figure 4:
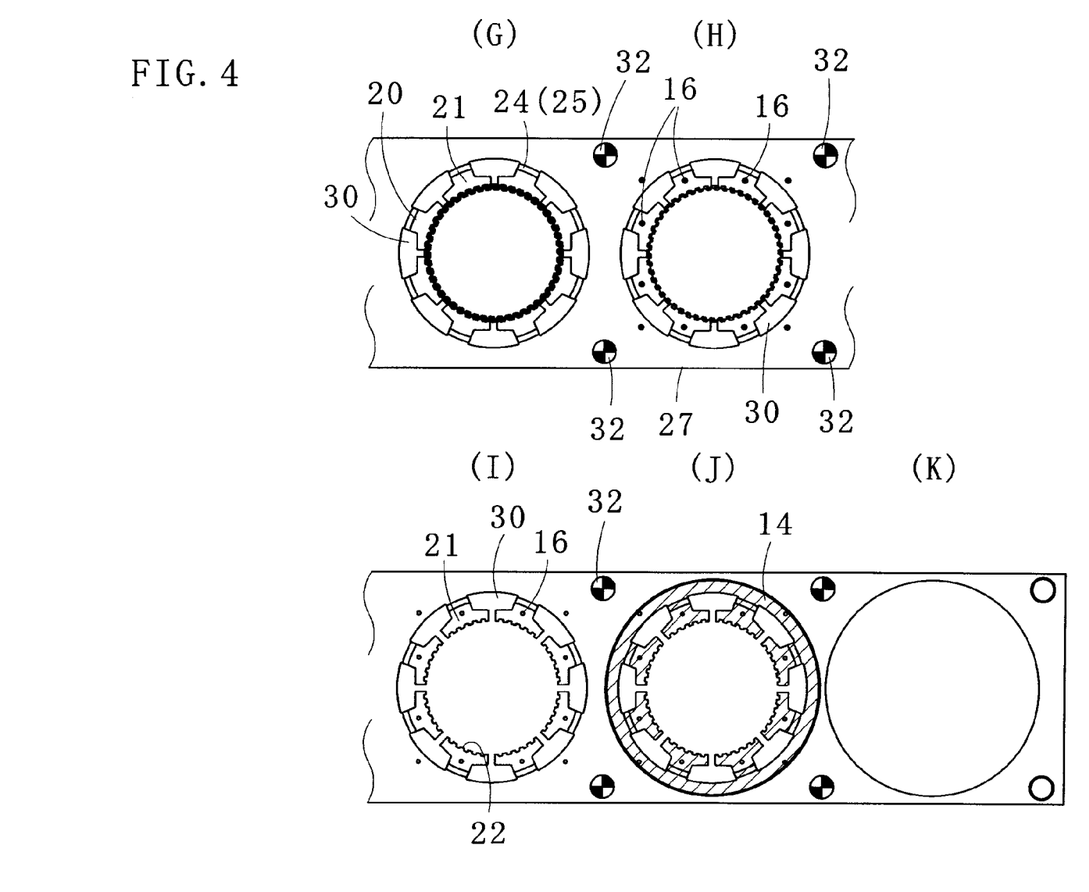
FIG. 4 is a process diagram showing the method for manufacturing the laminated core according to one embodiment of the present invention.

As shown in FIGS. 3 and 4, in the method for manufacturing the laminated core according to one embodiment of the present invention, a thin strip material 27 made of the magnetic metal sheet is fed into a die device (progressive die) having stations (A)-(K), thereby manufacturing the laminated core through processes (A)-(K). Hereinafter, the detail descriptions thereon will be given.

In the station (A), namely, in the process (A) (hereinafter the same shall apply), a pair of first pilot holes 28 and preparatory slots 29 are formed in the thin strip material 27. The preparatory slots 29 rough out circumferential shapes in the magnetic pole shaft piece 20 and the magnetic pole tooth piece 21 of the stator core sheet 14. In this embodiment, the stator core sheet 14 includes eight (plural) magnetic pole pieces 19, thus the eight preparatory slots 29 are formed at once.

Here, the preparatory slot 29 is smaller than a finishing slot 30, described hereinbelow, and includes a little allowance therearound. For example, the allowance may be 0.5-10 times the material thickness.

In the station (B), a positioning of the thin strip material 27 is performed with the first pilot holes 28, and the caulking portions 17 and a shaft hole 17a of the rotor core sheet 15 are blanked.

The station (C) is an idle station.

The rotor core sheet 15 and the stator core sheet 14 are formed so as to have a common axis.

In the station (D), the rotor core sheet 15 is blanked and dropped into a die (female die), and laminated inside the die, thereby forming the rotor core 11. In the station (E), with reference to the first pilot holes 28, the magnetic pole shaft pieces 20 defined by the preparatory slots 29 are equally coined by pressing parts of the magnetic pole shaft pieces 20 using a ring-shaped punch.

In this case, a stripper provided in the die device holds areas radially outside the coined portions (grooves 24) such that areas radially inside the same are open. Thus, an excess thickness created by coining moves (expands) to the areas radially inside the coined portions. The magnetic pole shaft piece 20 is elongated in the radially inward direction by coining, so that the elongation length of the magnetic pole shaft piece 20 is 30-80% of the thickness of the thin strip material 27.

Preferably, the groove 24 (corresponding to the thin section 25) formed by coining is located in an innermost part of the magnetic pole shaft piece 20. This arrangement can minimize the deformation of the elongated magnetic pole tooth piece 21.

A volume of the portion elongated by coining (a material thickness "t"× a width of the magnetic pole shaft piece 20× an elongated length) is approximately equal to a volume of the groove 24 (a depth of the groove 24× the width of the magnetic pole shaft piece 20× a radial length "a" of the groove 24). If the groove 24 is too deep, magnetic properties of the magnetic pole shaft piece 20 become worse. Thus, the depth of the groove 24 is preferably within 0.1-0.5 times, more preferably 0.1-0.4 times, the material thickness (See FIG. 2 (B)).

In this embodiment, the adjacent magnetic pole tooth pieces 21 are connected to each other in the circumferential direction. If the magnetic pole shaft pieces 20 are elongated in the radially inward direction, the magnetic pole shaft pieces 20 are deformed by coining. In particular, the magnetic pole tooth pieces 21 are bent upwardly. Such bending deformations are pressed (straightened) in the next station (F). Specifically, the thin strip material 27 is pressed with the stripper used in the station (F). Alternatively, a station for straightening the bending deformations may be provided between the stations (E) and (F), or after the station (F).

In the station (F), with reference to the first pilot holes 28 created in the initial process, the second pilot holes 32 are formed to overlap the first pilot holes 28 in a manner that the second pilot holes 32 have a larger diameter than that of the first pilot holes 28 located at the downstream side of the straightened thin strip material 27. In other words, pilot holes are redefined and recreated. Also in the station (F), the finishing slots 30 are blanked, forming final shapes of the magnetic pole shaft pieces 20 and the circumferential shapes of the magnetic pole tooth pieces 21. At this time, the finishing slot 30 is blanked so as to include a whole or a large part of the circumference of the preparatory slot 29.

Alternatively, the second pilot hole 32 may be placed in a different position from the first pilot hole 28. Also, the second pilot hole 32 may be formed with reference to the finishing slot 30 after the formation thereof.

In the station (G), first slits 33 and second slits 34 are blanked with reference to the second pilot holes 32. The first slits 33 outline the small teeth 22 located radially inside the magnetic pole tooth piece 21, and the second slits 34 outline the adjacent magnetic pole tooth pieces 21.

Figure 5:
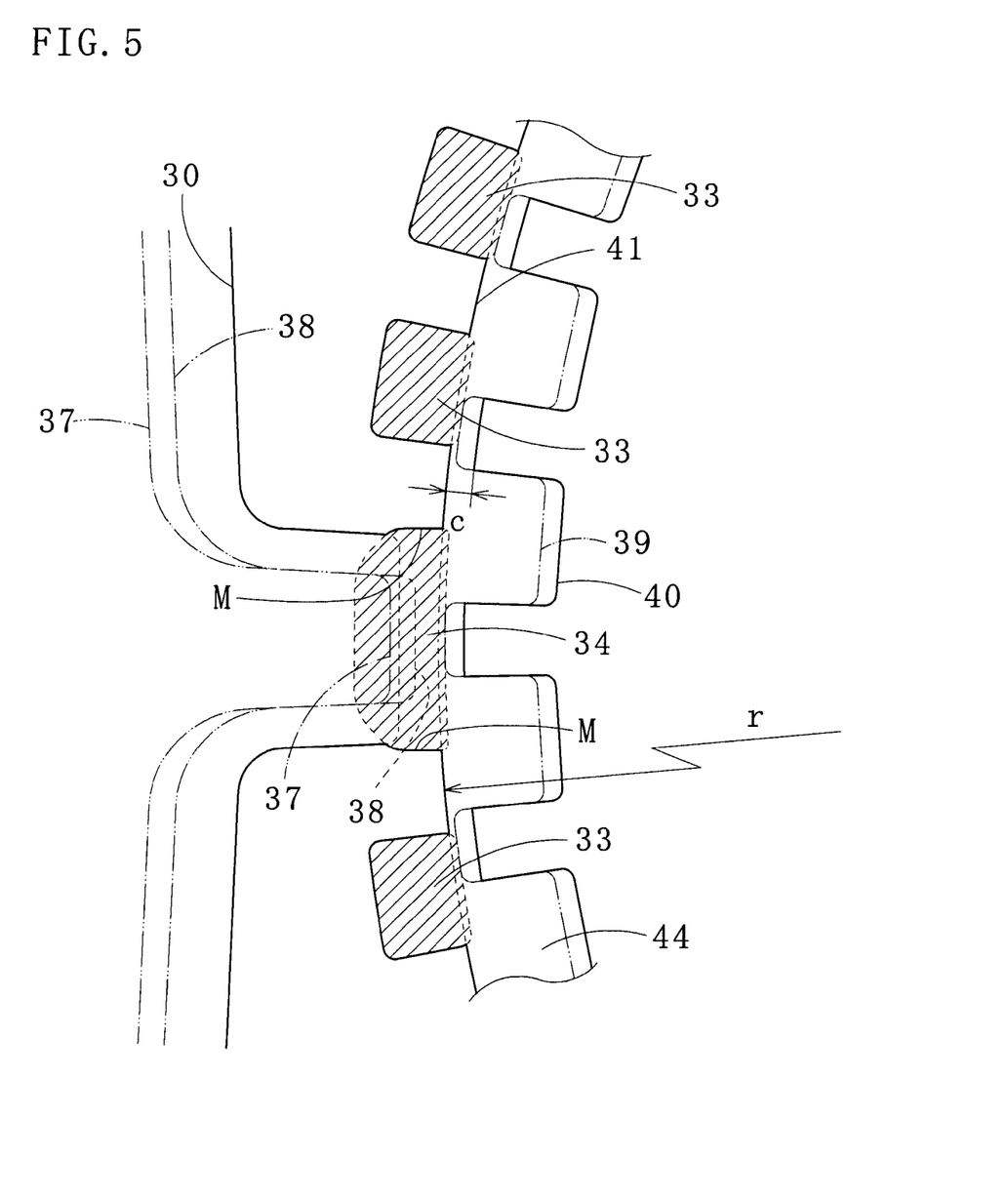
FIG. 5 is an explanatory diagram showing the method for manufacturing the laminated core according to one embodiment of the present invention.

Referring to FIG. 5, a detail description will be given on the first slit 33 and the second slit 34.

In FIG. 5, the first slit 33 and the second slit 34 are shown by hatching. An outline 37 of the preparatory slot 29 is shown by a two-dot chain line. Also, an outline 38 of the preparatory slot 29, elongated in the radial direction at the coining of the magnetic pole shaft piece 20, is shown by a two-dot chain line. The outline 38 is inside the outline 37. A two-dot chain line 39 indicates an outline of the blanked rotor core sheet 15 before coining, and a solid line 40 indicates the outline of the same after coining.

The second slit 34 is blanked to partly include a forming region of the finishing slot 30. In other words, the outlines of the second slit 34 and the finishing slot 30 cross each other (i.e., the outlines are mismatched), so that slightly depressed portions "M" are formed in the small teeth 22 located at the both lateral sides of the magnetic pole tooth piece 21. Since the blanking lines are overlapped like this, portions between the adjacent outlines of the second slit 34 and the finishing slot 30 can be blanked without being left, and also generation of burrs can be prevented.

In the station (H), the caulking portions 16 are formed with reference to the second pilot holes 32. A lowermost stator core sheet 14 of the stator core 10 has the caulking portions 16 each formed by a through hole, and the stator core sheets 14 subsequently laminated thereon have downwardly protruding caulking portions 16. The station for forming the through holes may be provided as a separate stage before the station (H).

In the stator core sheet 14 as shown in FIGS. 1 and 2, the caulking portions 16 are formed alternately on the radially outside and the inside of the magnetic pole pieces 19. However, as shown in the station (H) and subsequent stations in FIG. 4, the caulking portions 16 may be formed radially inside the magnetic pole pieces 19 and in the yoke piece 18 in a pitch of two magnetic poles. To further improve the magnetic properties, the caulking portions 16 may be formed only in the yoke piece 18.

In the station (I), a circle with radius "r," forming inner end lines of the small teeth 22, is blanked. A solid line 41 shows outlines of the small teeth 22 formed by this blanking. As shown in FIG. 5, a metal clipping (scrap) 44 of an annular piece is removed, which is defined by an outline of the circle with radius "r" and a solid line 40. As a result, the formation of the magnetic pole tooth pieces 21 is completed, forming the small teeth 22 throughout the stations (F), (G), and (I).

In a last step for forming the small teeth 22, the small teeth 22 may be formed using the die device (punch and die) which has shapes of grooves between the small teeth 22 and radially inner ends of the small teeth 22. However, configuration of the die device becomes complicated. In this embodiment, the grooves and the radially inner ends of the small teeth 22 are blanked using the different punches and dies, thereby generating the annular metal clipping 44. Thus, it is advantageous that the punches and dies can be easily manufactured and maintained.

Here, the metal clipping 44 has a minimum radial length "c" of 0.1 mm (more preferably 0.2 mm) or more.

In the next station (J), an outline of the stator core sheet 14 is blanked, and interlocked and laminated inside the die (female die).

The station (K) in FIG. 4 shows the thin strip material (skeleton) after the stator core sheet 14 and the rotor core sheet 15 are blanked.

The present invention is not limited to the above-stated embodiment and can include modifications in the dimensions, numbers of the magnetic poles, and shapes of the magnetic pole teeth made within the gist of the present invention.

Furthermore, the present invention is applicable to a laminated core formed with normal stator core sheets, which do not include the small teeth inside the magnetic pole tooth pieces.

INDUSTRIAL APPLICABILITY

In a method for manufacturing a laminated core according to the present invention, a stator core sheet includes magnetic pole shaft pieces and magnetic pole tooth pieces connecting thereto which are formed in precise shapes, thereby reducing a gap between a rotor and a stator as well as manufacturing a motor with a high torque. Furthermore, a rotor core sheet and the stator core sheet are produced from a strip of magnetic steel sheet concentrically, thereby improving material yields of the laminated core.

REFERENCE SIGNS LIST

10: stator core, 11: rotor core, 12: yoke section, 13: magnetic pole section, 14: stator core sheet, 15: rotor core sheet, 16, 17: caulking portion, 17a: shaft hole, 18: yoke piece, 19: magnetic pole piece, 20: magnetic pole shaft piece, 21: magnetic pole tooth piece, 22: small teeth, 24: groove, 25: thin section, 27: thin strip material, 28: first pilot hole, 29: preparatory slot, 30: finishing slot, 32: second pilot hole, 33: first slit, 34: second slit, 37: outline of preparatory slot, 38: outline of elongated preparatory slot, 39: two-dot chain line (blanking outline of stator core sheet before coining), 40: solid line (blanking outline of stator core sheet after coining), 41: solid line (bore diameter of small teeth), 44: metal clipping (scrap), M: depressed portion

The invention claimed is:

1. A method for manufacturing a laminated core, comprising:
   a first step of forming rotor core sheets and stator core sheets from a thin strip material, each of the stator core sheets being positioned so as to have a common axis with each of the rotor core sheets, each of the stator core sheets including a ring-shaped yoke piece and a plurality of magnetic pole pieces, the magnetic pole pieces integrally extending from a radially inside of the yoke piece, each of the magnetic pole pieces including a magnetic pole shaft piece and a magnetic pole tooth piece; and
   a second step of laminating the stator core sheets inside a die,
   wherein the first step comprises the steps of:
      forming first pilot holes on the thin strip material;
      with reference to the first pilot holes, punching out the rotor core sheets and preparatory slots which are smaller than finishing slots to form preparatory magnetic pole pieces having preparatory magnetic pole shaft pieces and preparatory magnetic pole tooth pieces;
      with reference to the first pilot holes, coining, thereby elongating a part of the preparatory magnetic pole shaft pieces in a radially inward direction; thereafter
      with reference to the first pilot holes, punching out the finishing slots over the preparatory slots to shape the magnetic pole pieces between each two of the adjacent finishing slots;
      forming second pilot holes at the same time with the punching out of the finishing slots; and
      with reference to the second pilot holes, shaping the magnetic pole tooth pieces from the preparatory magnetic tooth pole pieces.

2. The method as defined in claim 1, wherein a length of the elongation of the magnetic pole pieces is within 30-80% of a thickness of the thin strip material not being elongated.

3. The method as defined in claim 1, wherein the second pilot holes have a larger diameter than the first pilot holes, and the second pilot holes are formed so as to overlap the first pilot holes.

4. The method as defined in claim 1, further comprising:
   forming caulking portions on the stator core sheets with reference to the second pilot holes; and
   interlocking the vertically adjacent stator core sheets with the caulking portions when being laminated one on another.

5. The method as defined in claim 1, wherein the shaping of the magnetic pole tooth pieces comprises:
   a) punching out first and second slits in a manner that leaves an annular piece located radially inside the magnetic pole tooth pieces and bridging the adjacent magnetic pole tooth pieces, the first slits forming adjacent small teeth of the magnetic pole tooth pieces, the second slits forming adjacent side ends of the adjacent magnetic pole tooth pieces; and thereafter b) punching out the annular piece so as to form radially inner ends between the adjacent small teeth.

6. The method as defined in claim 5, wherein the annular piece has a minimum radial length of 0.1 mm or more.

7. A method for manufacturing a laminated core, comprising:
- a first step of forming rotor core sheets and stator core sheets from a thin strip material, each of the stator core sheets being positioned so as to have a common axis with each of the rotor core sheets, each of the stator core sheets including a ring-shaped yoke piece and a plurality of magnetic pole pieces, the magnetic pole pieces integrally extending from a radially inside of the yoke piece, each of the magnetic pole pieces including a magnetic pole shaft piece and a magnetic pole tooth piece; and
- a second step of laminating the stator core sheets inside a die;
- wherein the first step comprises the steps of:
    - forming first pilot holes on the thin strip material;
    - with reference to the first pilot holes, punching out the rotor core sheets and preparatory slots which are smaller than finishing slots to form preparatory magnetic pole pieces having preparatory magnetic pole shaft pieces and preparatory magnetic pole tooth pieces;
    - with reference to the first pilot holes, coining, thereby elongating a part of the preparatory magnetic pole shaft pieces in a radially inward direction; thereafter
    - with reference to the first pilot holes, punching out the finishing slots over the preparatory slots to shape the magnetic pole pieces between each two of the adjacent finishing slots;
    - forming second pilot holes after the punching out of the finishing slots; and
    - with reference to the second pilot holes, shaping the magnetic pole tooth pieces from the preparatory magnetic tooth pole pieces.

8. The method as defined in claim 7, wherein a length of the elongation of the magnetic pole pieces is within 30-80% of a thickness of the thin strip material not being elongated.

9. The method as defined in claim 7, wherein the second pilot holes have a larger diameter than the first pilot holes, and the second pilot holes are formed so as to overlap the first pilot holes.

10. The method as defined in claim 7, further comprising:
- forming caulking portions on the stator core sheets with reference to the second pilot holes; and
- interlooking the vertically adjacent stator core sheets with the caulking portions when being laminated one on another.

11. The method as defined in claim 7, wherein the shaping of the magnetic pole tooth pieces comprises:
a) punching out first and second slits in a manner that leaves an annular piece which is located radially inside the magnetic pole tooth pieces and bridging the adjacent magnetic pole tooth pieces, the first slits forming adjacent small teeth located radially inside the magnetic pole tooth pieces, the second slits forming adjacent side ends of the adjacent magnetic pole pieces; and thereafter
b) punching out the annular piece so as to form radially inner ends between the adjacent small teeth.

12. The method as defined in claim 11, wherein the annular piece has a minimum radial length of 0.1 mm or more.

* * * * *